(12) United States Patent
Vrdoljak et al.

(10) Patent No.: US 10,584,990 B2
(45) Date of Patent: Mar. 10, 2020

(54) METHOD FOR OPERATING A MEASURING APPARATUS

(71) Applicant: Endress + Hauser Wetzer GmhH + Co. KG, Nesselwang (DE)

(72) Inventors: Pavo Vrdoljak, Nesselwang (DE); Peter Seefeld, Bad Wimpfen (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 267 days.

(21) Appl. No.: 15/038,917

(22) PCT Filed: Nov. 3, 2014

(86) PCT No.: PCT/EP2014/073511
§ 371 (c)(1),
(2) Date: Nov. 16, 2016

(87) PCT Pub. No.: WO2015/082144
PCT Pub. Date: Jun. 11, 2015

(65) Prior Publication Data
US 2017/0059372 A1   Mar. 2, 2017

(30) Foreign Application Priority Data

Dec. 3, 2013 (DE) .......................... 10 2013 113 365

(51) Int. Cl.
| | | |
|---|---|---|
| *G01F 1/32* | (2006.01) | |
| *G01F 1/66* | (2006.01) | |
| *G01F 25/00* | (2006.01) | |
| *G01F 15/18* | (2006.01) | |
| *G01F 1/58* | (2006.01) | |

(52) U.S. Cl.
CPC .............. *G01F 1/3263* (2013.01); *G01F 1/66* (2013.01); *G01F 15/18* (2013.01); *G01F 25/003* (2013.01); *G01F 1/32* (2013.01); *G01F 1/58* (2013.01)

(58) Field of Classification Search
USPC ......................................................... 702/45
See application file for complete search history.

(56) References Cited

U.S. PATENT DOCUMENTS

| | | |
|---|---|---|
| 6,386,046 B1 | 5/2002 | Mattar |
| 6,651,512 B1 | 11/2003 | Kleven et al. |

(Continued)

FOREIGN PATENT DOCUMENTS

| | | |
|---|---|---|
| CN | 102648400 A | 8/2012 |
| EP | 1077378 A1 | 2/2001 |

(Continued)

OTHER PUBLICATIONS

English Translation of International Preliminary Report on Patentability, WIPO, Geneva, dated Jun. 16, 2016.

(Continued)

*Primary Examiner* — Paul D Lee
(74) *Attorney, Agent, or Firm* — Bacon & Thomas, PLLC

(57) ABSTRACT

A method for operating a measuring apparatus, comprising the steps as follows: ascertaining a flow velocity; comparing the ascertained flow velocity with a threshold value, which corresponds to a critical loading, especially to a resonant frequency, of a measuring apparatus immersion body protruding into the flow; and outputting a report, which signals reaching of a critical flow and/or frequency.

16 Claims, 1 Drawing Sheet

(56) References Cited

U.S. PATENT DOCUMENTS

| | | | |
|---|---|---|---|
| 9,038,481 | B2 | 5/2015 | Schiferli |
| 2002/0035456 | A1* | 3/2002 | Cremers ............. G06F 17/5018 703/5 |
| 2009/0211368 | A1 | 8/2009 | Garnett et al. |
| 2011/0054822 | A1 | 3/2011 | Bauschke et al. |
| 2011/0301867 | A1 | 12/2011 | Davis et al. |
| 2011/0320140 | A1* | 12/2011 | Butler ................... G01F 15/063 702/45 |
| 2012/0266689 | A1* | 10/2012 | Schiferli ............... G01F 1/3227 73/861.18 |

FOREIGN PATENT DOCUMENTS

| | | |
|---|---|---|
| EP | 1092959 A1 | 4/2001 |
| WO | 2011028220 A2 | 3/2011 |
| WO | 2011043667 A1 | 4/2011 |
| WO | 2011161298 A1 | 12/2011 |

OTHER PUBLICATIONS

International Search Report EPO, The Netherlands, dated Jan. 23, 2015.
German Search Report, German PTO, Munich, dated Mar. 24, 2014.
David S. Bartran et al., "Flow induced vibration of thermowells," ISA Transaction, 38, 1999, Elsevier Science B.V., cover letter and pp. 123-132.
David S. Bartran et al., "Static and dynamic stresses pf practical thermowells,", ISA Transactions, 39, 2000, Elsevier Science B.V., pp. 133-142.
David S. Bartran et al., "Thermowell Design and Selection", draft paper accepted for publication, "Hydrocarbon Processing," Oct. 2, 2000, pp. 1-11.
Masaki Morishita et al., "Fatigue analysis of thermowell due to flow-induced vibration," ASME International, Flow-Induced Vibration and Transient Thermal-Hydraulics, 1998, PVP—vol. 363, pp. 119-124.
Koji Dozaki et al., "Modification and design guide of thermowell for FBR," ASME International, Reprinted from Flow-Induced Vibration and Transient Thermal-Hydraulics, 1998, PVP—vol. 363, pp. 125-133.
Masaki Morishita et al., "History of flow-induced vibration incident occurred in Monju," ASME International, Reprinted from Flow-Induced Vibration and Transient Thermal-Hydraulics, 1998, PVP—vol. 363, pp. 103-108.
Kenji Ogura et al., "Cause of flow-induced vibration of thermo-couple well," ASME International, Reprinted from Flow-Induced Vibration and Transient Thermal-Hydraulics, 1998, PVP—vol. 363, pp. 109-116.
Dirk Bauschke et al., "Thermowell Calculations," White Paper, Emerson Process Management, Jan. 2012, pp. 1-20.

* cited by examiner

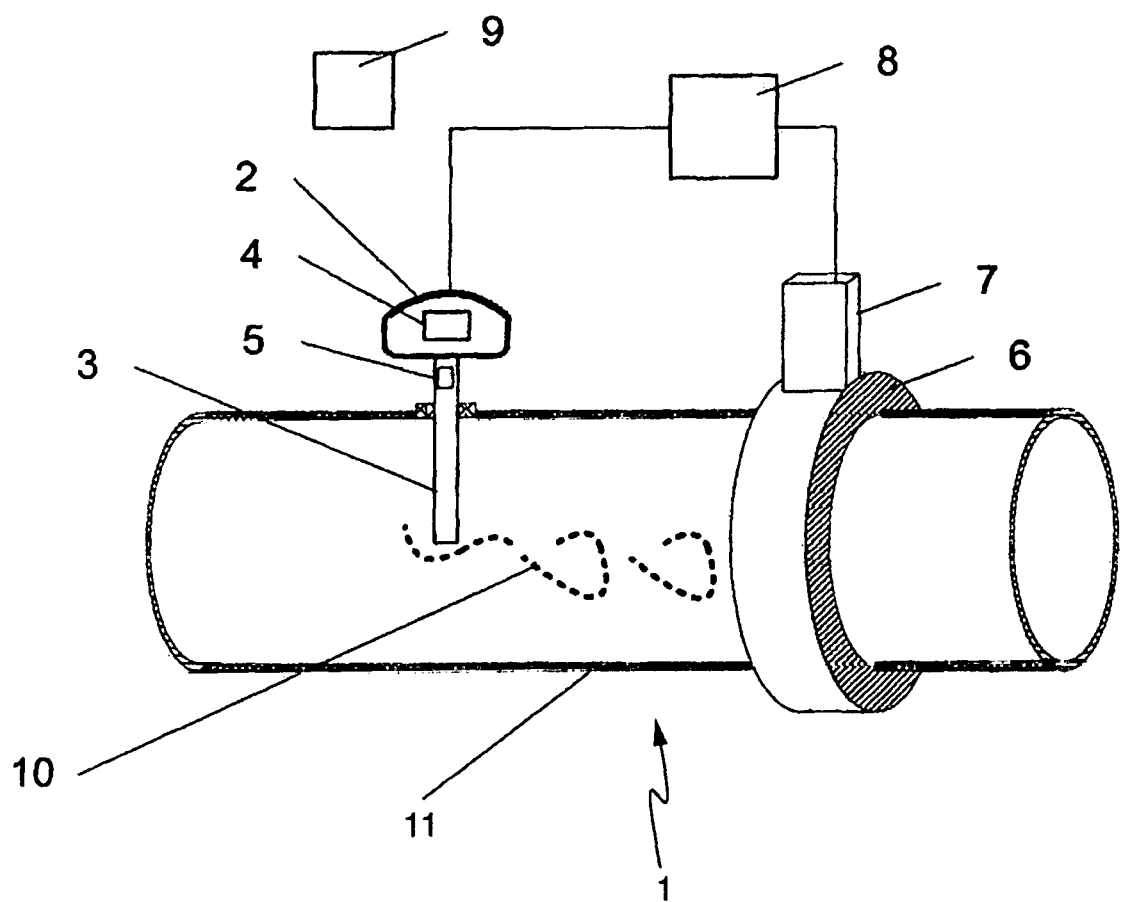

METHOD FOR OPERATING A MEASURING APPARATUS

TECHNICAL FIELD

The invention relates to a method for operating a measuring apparatus. Furthermore, the invention relates to a measuring apparatus for performing the method.

BACKGROUND DISCUSSION

Known from the state of the art as exemplified in Offenlegungsschrift (Laid-open application) WO 2011028220 A2 is a measuring apparatus for monitoring a protective tube. A measuring transducer applied directly on the protective tube is used for registering vibrations. This requires, however, a corresponding separate or additional measuring transducer, which is connected with the protective tube. This leads, thus, to extra costs and to a special construction of the measuring apparatus, especially an additional connection between protective tube and connection head, respectively transmitter electronics.

In general, there is in the case of an immersion body protruding into a flow the problem that vibrations caused by the flow in the worst case can lead to a tearing off of the immersion body. This is true not only for protective tubes for a thermometer but also for other apparatuses, for example, in the case of an immersion body, such as is used in the case of thermal flow measurement or for pH-value determination.

A tearing off of or a leak in the immersion body can lead to the failure of the measuring apparatus and even to shut down of the process running in a plant.

SUMMARY OF THE INVENTION

An object of the invention is to provide for monitoring and operating a measuring apparatus having an immersion body.

The object is achieved according to the invention by a method and a measuring apparatus.

As regards the method, the object is achieved by a method for operating a measuring apparatus, comprising steps as follows: Ascertaining a flow velocity; comparing the ascertained flow velocity with a threshold value, which corresponds, for example, to a critical loading, especially to a resonant frequency, of a measuring apparatus immersion body protruding into the flow, and outputting a report, which signals a reaching of a critical flow and/or frequency.

Thus, a measuring device likewise installed in the flow can be used, especially for registering the flow, respectively the flow velocity or another characteristic value, which serves as threshold value or as comparison value with a threshold value. As a function of this comparison, then a report, especially a warning, can be output. Used as relationship between the flow velocity and a resonant frequency can be, for example, the Strouhal number St, respectively the Strouhal relationship, $St=f*L/v$, wherein f is the vortex shedding frequency, L the length of the obstacle, and v the flow velocity. The Strouhal number, in turn, can be determined from the Reynolds number.

The measuring apparatus includes for this purpose, thus, for example, an immersion body, which serves for accommodating a measuring insert. The measuring insert, in turn, can be a measuring transducer, for example, for ascertaining the temperature of a measured material in a container, in which the immersion body is inserted.

The flow velocity can, for example, also be ascertained by means a sensor accommodated in the immersion body, for example, in the case of a thermal flow measuring device, which has at least one immersion body, in which a sensor is arranged.

A furnished threshold value, which corresponds to a critical loading of the immersion body, can then be used, in order to be compared with the ascertained flow velocity or a value derived therefrom.

The exceeding of the threshold value can then, for example, be signaled to a user by a corresponding diagnostic report. It is likewise possible to output the report directly in the field on the measuring system, for example, in the form of a visual signal or an acoustic signal. On the other hand, a corresponding diagnostic signal can be communicated, for example, digitally, especially via a fieldbus, to a control room or to some other data processing unit.

In a form of embodiment of the method, a vortex shedding frequency on the immersion body is determined from the ascertained flow velocity. This can occur, such as already explained, for example, via the Strouhal relationship (see above).

Thus, for example, the manufacturer of the immersion body or someone else later can provide a calculational method or a table or some other means, which enables, based on the determined flow velocity, determination of a vortex shedding frequency on the immersion body. This vortex shedding frequency can then be compared with a corresponding threshold value, upon the reaching of which, for example, based on experience, a critical loading of the immersion body occurs.

The threshold value can naturally also be selected sufficiently spaced from the frequency corresponding to a critical loading, in order to provide an adequate cushion against endangering the integrity of the protective tube.

Instead of the here mentioned resonant frequency, it can, however, also be another critical loading, preferably mechanical or, however, also another loading such as, for example, that arising from cavitation on the immersion body.

In an additional form of embodiment of the method, the immersion body is a protective tube of a measuring apparatus for determining temperature. The set of problems burdening protective tubes especially of temperature measuring apparatuses has already been explained above in the introduction and especially in the state of the art, i.e. WO 2011/028220. The form of embodiment explained here enables in contrast such a detection of critical loading that no additional measuring transducer is needed on the protective tube.

In an additional form of embodiment of the method, the flow velocity is ascertained by means of a flow measuring apparatus. For example, the measurement signal or a measured value of the flow measuring apparatus or a value derived therefrom can be taken into consideration, in order to be compared with the threshold value. Thus, on the one hand, a first measuring transducer can be arranged in the immersion body for determining a first physical and/or chemical variable, and, on the other hand, a second measuring transducer situated in the flow, such as, for example, a measuring transducer of a flow measuring device can be arranged in the flow and serve for ascertaining the flow, respectively the flow velocity.

In an additional form of embodiment of the method, the immersion body and the flow measuring apparatus are arranged in the same pipeline section. Preferably, the same pipeline section means a pipeline section, which has essentially the same flow characteristics, or from which the flow characteristics at the site of the first measuring transducer, respectively the immersion body, can be determined.

In an additional form of embodiment of the method, the measuring apparatus has a first measurement transmitter, by means of which the ascertained flow velocity is compared with the threshold value.

In an additional form of embodiment of the method, a measured value corresponding to the ascertained flow velocity is transmitted to the first measurement transmitter.

In an additional form of embodiment of the method, the measured value corresponding to the ascertained flow velocity is transmitted from a second measurement transmitter to the first measurement transmitter.

Alternatively, also only one measurement transmitter or a corresponding measured values processing unit can be provided, to which is connected both a first measuring transducer (for example, for determining temperature), which is inserted in the immersion body, and a second measuring transducer, for example, for determining flow or flow velocity, etc.

In an additional form of embodiment of the method, the resonant frequency is the eigenfrequency of the immersion body.

In an additional form of embodiment of the method, the method is performed at least at times during operation of the measuring apparatus. On the one hand, empirical values as regards the loading of the immersion body can, naturally, for experimental purposes, be ascertained in a test. According to this form of embodiment of the proposed invention, however, the method is performed during the intended operation of the measuring apparatus, thus on-site in a plant.

In an additional form of embodiment of the method, the eigenfrequency of the immersion body is furnished in the first measurement transmitter. Eigenfrequency refers here to the first resonance mode or also a higher resonance mode of the immersion body.

In an additional form of embodiment of the method, the immersion body is provided with an identification means, from which the eigenfrequency of the immersion body can be learned. For example, corresponding information can be placed on the protective tube, for example, by (laser-engraving) on the immersion body.

In an additional form of embodiment of the method, the eigenfrequency of the immersion body is ascertained based on a photographic picture, preferably by means of an integral calculational method, such as, for example, the Ritz method, especially the Rayleigh-Ritz method.

In an additional form of embodiment of the method, the first measurement transmitter is connected via a communication connection with a superordinated unit, wherein the identification means and/or the photographic picture of the immersion body is transmitted to the superordinated unit, and the ascertaining of the eigenfrequency of the immersion body is performed by the superordinated unit, wherein the eigenfrequency or a threshold value derived therefrom is transmitted to the first measurement transmitter.

As regards the measuring apparatus, the object is achieved by a measuring apparatus for performing the method according to one of the preceding forms of embodiment.

BRIEF DESCRIPTION OF THE DRAWINGS

The invention will now be explained in greater detail based on the appended drawing, the sole FIGURE of which shows as follows:

FIG. 1 is a schematic representation of a measuring system according to one form of embodiment of the proposed invention.

DETAILED DISCUSSION IN CONJUNCTION WITH THE DRAWINGS

The measuring apparatus 1 includes an immersion body 3 in the form of a protective tube, into which a measuring insert is insertable. The measuring insert, not shown, comprises, in such case, for example, at least a first measuring transducer for determining a physical and/or chemical variable.

Furthermore, a flow measuring apparatus 6 is provided, which comprises at least a second measuring transducer, which serves for determining the flow velocity of the measured material in a container 11. The flow measuring apparatus 6 can be, for example, one working according to the ultrasonic measuring principle, the magneto-inductive measuring principle, the thermal measuring principle, the vortex measuring principle or the Coriolis measuring principle.

As shown in FIG. 1, the first and second measuring transducers are connected via corresponding measurement transmitters 2, respectively 7, with an evaluation unit 8. The two measuring transducers could, however, also be connected with their own evaluation units, for example, in the form of measurement transmitters. Alternatively thereto, a single evaluation unit could also be accommodated in one of the measurement transmitters 2, 7. The evaluation unit 8 could, for example, be implemented by software, for example, in one of the two measurement transmitters 2, 7.

Based on the ascertained flow velocity, a loading of the immersion body 5 can be ascertained. This can occur, for example, based on a threshold value furnished in the evaluation unit 8. The threshold value can be furnished for this purpose, for example, in a memory unit of the evaluation unit 8.

The threshold value can then be compared with the flow velocity. This can occur, for example by determining a flow velocity corresponding to a critical loading of the immersion body and then determining a threshold value of the flow velocity.

The loading of the immersion body 3 can be a mechanical loading, especially of the material, of which the immersion body 3 is composed. This loading can result in material fatigue, material removal, etc.

The cause of the loading can be, for example, vortex shedding on the immersion body 3 occurring, for example, at a resonant frequency of the immersion body 3. The resonant frequency corresponds, in such case, to the eigenfrequency of the immersion body 3.

In calibration or testing of the immersion body 3, for example, that flow velocity can be experimentally determined, in the case of which due to the geometry of the immersion body 3 a vortex shedding 10 occurs on the immersion body 3 with the eigenfrequency of the immersion body 3. Correspondingly, a threshold value of the flow velocity can be set. The threshold value can lie, for example, in the vicinity of or below or above the corresponding flow velocity.

Likewise, based on the ascertained flow velocity, a vortex shedding frequency can be determined based, for example, on a furnished formula or mapping. This determined vortex shedding frequency can then be compared with a threshold value of the vortex shedding frequency. The threshold value of the vortex shedding frequency can be set as a function of the resonant frequency, respectively the eigenfrequency, of the immersion body, preferably such that the threshold value lies below the resonant frequency of the immersion body.

For determining the resonant frequency, respectively eigenfrequency, of the immersion body 3, in turn, a modal analysis of the immersion body 3, in the case of which it is preferably a protective tube, can be performed, for example, by means of a computer unit, which can, for example, be integrated in one of the measurement transmitters 2, 7 or the evaluation unit 8. The modal analysis can also be performed by a superordinated unit, i.e., for example, by a calculating unit arranged removed from the plant. A result of the modal analysis, such as, for example, the eigenfrequency of the immersion body 3, can then be transmitted to the measuring apparatus 1.

The modal analysis can occur, for example, based on a photographic picture or another type of recording of the immersion body 3. The eigenfrequency calculation can also be performed by the measurement transmitter 2, also referred to as a process transmitter.

Shown in FIG. 1 is likewise an opportunity for reading out an eigenfrequency of the immersion body 3, a threshold value or a flow velocity by means of identification means mounted on the immersion body 3 and/or on a connection head or head transmitter 2, for example, of a temperature measuring device. The identification means can be, for example, a marking 5, for example, a barcode or QR code. The identification means can be provided either on the immersion body 3 or on a component connected therewith, such as, for example, the measurement transmitter (housing) 4.

By means of an apparatus 9 for picture taking, then this identification means can be registered photographically. By means of a method for picture processing, then this information concerning the resonant frequency, the threshold value or the flow velocity can be extracted and transmitted to the evaluation unit or input there.

Alternatively, also a photographic picture of the immersion body 3 or at least a section of the same can serve as identification means. Also, based on a photographic picture of the total immersion body 3, for example, the resonant frequency of the immersion body can be ascertained. In this regard, for example, the Ritz method or the Rayleigh-Ritz method can be used to determine the eigenoscillations of the immersion body 3.

The resonance frequencies are preferably bending oscillations of the immersion body 3. Such an eigenfrequency of the immersion body can be calculated, for example, also by means of one or more geometrical and/or material parameters of the immersion body 3.

Especially also a remedial measure suppressing the, in given cases, arising resonances can be performed in the case of a flow velocity, which exceeds the threshold value. Also, a warning signal can be output on-site at the measuring point or in a superordinated unit, such as, for example, the control room or the evaluation unit. In this case, the registering of the oscillation frequency of the immersion body 3 can also occur by means of a sensor mounted directly on the immersion body 3 for registering oscillations of the immersion body 3.

The proposed invention can, thus, increase the operational safety of an immersion body 3, such as, for example, a protective tube.

Alternatively to determining the flow velocity, for example, by a flow sensor 6, also the pressure difference at two locations of the container 11 can be taken into consideration for determining a critical loading of the immersion body 3 based on a comparison with a threshold value.

The invention claimed is:

1. A method for monitoring a measuring apparatus having an immersion body in the form of a protective tube into which a first transducer for determining a physical or chemical variable is inserted, wherein the immersion body is protruding into a medium flowing through a pipe, and a flow measuring apparatus for measuring a flow velocity of the medium through the pipe according to a vortex shedding of the immersion body, consisting of said protruding immersion body and a second transducer measuring the flow velocity based on the vortex shedding of the immersion body, comprising the steps of:
   ascertaining flow velocity of the medium flowing through the pipe;
   monitoring a critical loading of the protruding immersion body by comparing the ascertained flow velocity with a critical flow velocity,
   wherein the critical loading is reached at the critical flow velocity when the protruding immersion body is excited to vibrate on its bending resonant frequency, and
   outputting a report signaling that the critical flow is reached if the flow velocity exceeds the critical flow velocity.

2. The method as claimed in claim 1, wherein:
   the immersion body is a protective tube of a measuring apparatus for determining temperature.

3. The method as claimed in claim 1, wherein:
   the flow velocity is ascertained by means of a flow measuring apparatus.

4. The method as claimed in claim 1, wherein:
   the immersion body and the flow measuring apparatus are arranged in a same pipeline section.

5. The method as claimed in claim 1, wherein:
   the measuring apparatus has a first measurement transmitter, by means of which the ascertained flow velocity is compared with the threshold value.

6. The method as claimed in claim 1, wherein:
   a measured value corresponding to the ascertained flow velocity is transmitted to a first measurement transmitter.

7. The method as claimed in claim 6, wherein:
   the measured value corresponding to the ascertained flow velocity is transmitted from a second measurement transmitter to the first measurement transmitter.

8. The method as claimed in claim 1, wherein:
   a resonant frequency is the eigenfrequency of the immersion body.

9. The method as claimed in claim 8, wherein:
   the eigenfrequency of the immersion body is furnished in a first measurement transmitter.

10. The method as claimed in claim 8, wherein:
    the immersion body is provided with an identification means, from which the eigenfrequency of the immersion body can be learned.

11. The method as claimed in claim 10, wherein:
    the first measurement transmitter is connected with a superordinated unit via a communication connection; and
    the identification means and/or a photographic picture of the immersion body is transmitted to the superordinated unit, the ascertaining of the eigenfrequency of the immersion body is performed by the superordinated unit, and the eigenfrequency or a threshold value derived therefrom is transmitted to the first measurement transmitter.

12. The method as claimed in claim 8, wherein:

the eigenfrequency of the immersion body is ascertained based on a photographic picture, by means of an integral calculational method.

13. The method as claimed in claim 12, wherein:

the integral calculational method is the Ritz method.

14. The method as claimed in claim 1, wherein:

the method is performed at least at times during operation of the measuring apparatus.

15. A measuring apparatus comprising:

a first transducer for determining a physical or chemical variable wherein the first transducer is inserted in an immersion body in the form of a protective tube, whereby the immersion body is protruding into a medium flowing through a pipeline, and a flow measuring apparatus for measuring the flow of the medium through the pipeline according to a vortex shedding of the immersion body, the flow measuring apparatus comprising a second transducer measuring the flow velocity based on the vortex shedding of the immersion body, whereby the flow measuring apparatus is arranged to ascertain the flow velocity of the medium through the pipe, wherein a super-ordinated unit is configured to:

compare the ascertained flow velocity with a critical flow velocity, wherein the critical flow velocity is reached when the protruding immersion body is excited to vibrate on its bending resonant frequency, and outputting a report signaling that the critical flow is reached if the flow velocity exceeds the critical flow velocity.

16. A method for monitoring a measuring apparatus having an immersion body in the form of a protective tube into which a first transducer for determining a physical or chemical variable is inserted, whereby the immersion body is protruding into a medium flowing through a pipe, and a flow measuring apparatus for measuring a flow velocity of the medium through the pipe, comprising the steps of:

ascertaining the flow velocity of the medium flowing through the pipe;

monitoring a critical loading of the protruding immersion body by comparing the ascertained flow velocity with a critical flow velocity, whereby the critical loading is reached at the critical flow velocity when the protruding immersion body is excited to vibrate on its bending resonant frequency, and outputting a report signaling that the critical flow is reached if the flow velocity exceeds the critical flow velocity.

* * * * *